United States Patent
Ha et al.

(10) Patent No.: US 7,750,984 B2
(45) Date of Patent: Jul. 6, 2010

(54) PHOTOLUMINESCENCE LIQUID CRYSTAL DISPLAY

(75) Inventors: Kyoung-ho Ha, Yongin-si (KR); Byoung-lyong Choi, Yongin-si (KR); Jae-ho Lee, Yongin-si (KR)

(73) Assignee: Samsung LED Co., Ltd., Gyeonggi-do (KR)

( * ) Notice: Subject to any disclaimer, the term of this patent is extended or adjusted under 35 U.S.C. 154(b) by 227 days.

(21) Appl. No.: 11/812,437

(22) Filed: Jun. 19, 2007

(65) Prior Publication Data
US 2008/0055515 A1 Mar. 6, 2008

(30) Foreign Application Priority Data
Aug. 31, 2006 (KR) .................. 10-2006-0083653

(51) Int. Cl.
*G02F 1/135* (2006.01)
*G02F 1/1335* (2006.01)
(52) U.S. Cl. .......................... 349/25; 349/61
(58) Field of Classification Search ............... 349/25
See application file for complete search history.

(56) References Cited

U.S. PATENT DOCUMENTS 6,295,106 B1 * 9/2001 Fukuzawa et al. ............. 349/71
7,440,044 B2 * 10/2008 Peterson et al. ............... 349/61

* cited by examiner

*Primary Examiner*—Uyen-Chau N Le
*Assistant Examiner*—Kajli Prince
(74) *Attorney, Agent, or Firm*—Harness, Dickey & Pierce, P.L.C.

(57) ABSTRACT

Provided is a photoluminescence liquid crystal display (LCD) using a light source emitting polarized light. The photoluminescence LCD may include a light source emitting polarized light, a light control unit including a liquid crystal layer having a plurality of pixel regions and modulating a polarization direction of the polarized light individually with respect to each of the pixel regions, a polarizer transmitting the modulated light only when the polarized light has a polarization direction, and a photoluminescence layer excited by the light transmitted through the polarizer and emitting excitation light by photoluminescence. Accordingly, an additional polarizer may not be on a rear surface of the light control unit, so that photoluminescence LCD may have a simpler structure and increased light use efficiency.

18 Claims, 5 Drawing Sheets

PHOTOLUMINESCENCE LIQUID CRYSTAL DISPLAY

PRIORITY STATEMENT

This application claims priority under 35 USC §119 to Korean Patent Application No. 10-2006-0083653, filed on Aug. 31, 2006, in the Korean Intellectual Property Office (KIPO), the entire contents of which are incorporated herein by reference.

BACKGROUND

1. Field

Example embodiments relate to a photoluminescence liquid crystal display (LCD). Other example embodiments relate to a photoluminescence LCD having a simpler panel structure and an increased efficiency in use of light by employing a light source emitting polarized light.

2. Description of the Related Art

An LCD may include a liquid crystal panel formed by injecting a liquid crystal between two substrates having field generating electrodes. An electrical field may be generated by a predetermined or given voltage applied to the electrodes. The generated electrical field may arrange liquid crystal molecules so that light passes through the arranged molecules. The LCD may display images by modulating the transmitted light.

An LCD may further include a backlight unit and a liquid crystal panel. The backlight unit may include a lamp, a lamp holder, a light guide plate, a reflection sheet, and a diffusion sheet. The liquid crystal panel may include the liquid crystal, polarizers, transparent electrodes, a thin film transistor (TFT) panel, and a color filter. Light emitted from the lamp may be weakened while passing through each optical component constructing the LCD and then may be used to illuminate a front surface portion of the liquid crystal panel.

FIG. 1 is a graph illustrating light loss ratio in each component in a conventional LCD. When studying the light loss ratio at each optical component, most light loss occurs at the color filter and the polarizer. For displaying a color image, a conventional LCD may use a color filter that may include a set of red R, green G, and blue B regions corresponding to each pixel. In an LCD with a color filter, each color region of the color filter may transmit light having a wavelength corresponding to its color. Only one third of the total light (white light) may be used for displaying an image. The light loss ratio may be at least about 67% at the color filter.

The liquid crystal panel generally may include a rear substrate, a front substrate, a liquid crystal layer, a rear polarizer, and a front polarizer. The liquid crystal layer may be formed between the rear substrate and the front substrate. The rear polarizer may be disposed on an outer surface of the rear substrate to transmit light having a specific polarization direction to the liquid crystal layer. The front polarizer may be disposed on an outside surface of the front substrate. For example, a general LCD may include two sheet type polarizers having a thickness of about several tens to about several hundreds of nanometers. Because only the light that passes through the rear polarizer is incident on the liquid crystal layer, light transmission efficiency may be less than about 50% when a light source emitting unpolarized light is used. A conventional LCD may display an image using only about 3% of the total amount of light emitted from a light source. For example, the conventional LCD may have a decreased light use efficiency.

SUMMARY

Example embodiments provide a photoluminescence liquid crystal display (LCD) that has an improved light use efficiency by removing an optical component that causes an increased amount of light loss.

According to example embodiments, a photoluminescence LCD may include a light source emitting polarized light, a light control unit including a liquid crystal layer having a plurality of pixel regions and modulating a polarization direction of the polarized light individually with respect to each of the pixel regions, a polarizer transmitting the modulated light only when the polarized light has a polarization direction, and a photoluminescence layer excited by the light transmitted through the polarizer and emitting excitation light by photoluminescence.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

FIG. 1 is a graph illustrating loss ratio of each component in a conventional liquid crystal display (LCD);

FIG. 2 is a schematic exploded perspective view of a photoluminescence LCD according to example embodiments;

FIG. 3 is a side view of the photoluminescence LCD of FIG. 2;

FIG. 4 is a view illustrating a modification example of a light guide plate of the photoluminescence LCD of FIG. 2 according to example embodiments;

FIG. 6 is a schematic cross-sectional view of a photoluminescence layer according to example embodiments; and FIG. 7 is a schematic cross-sectional view of a photoluminescence layer according to example embodiments.

DETAILED DESCRIPTION OF EXAMPLE EMBODIMENTS

Figure 1:
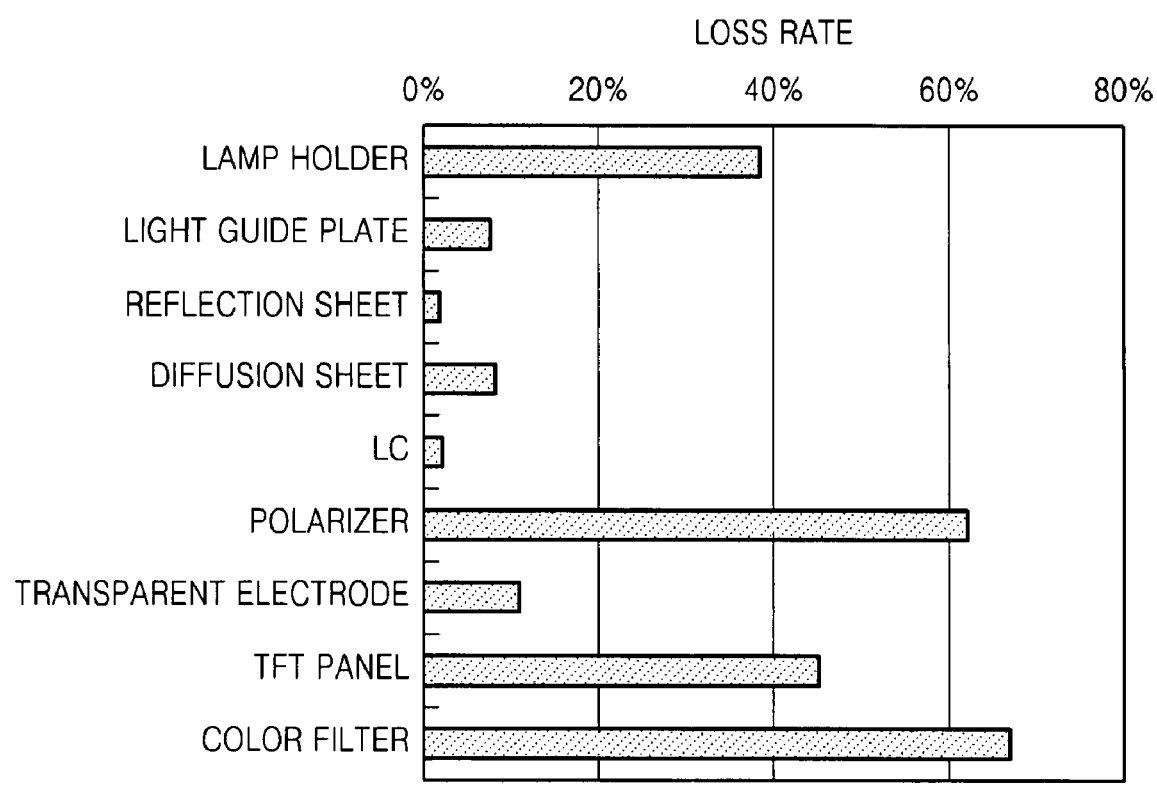

A photoluminescence LCD of example embodiments will now be described more fully with reference to the accompanying drawings, in which example embodiments are shown. In the drawings, the thicknesses of layers and regions are exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
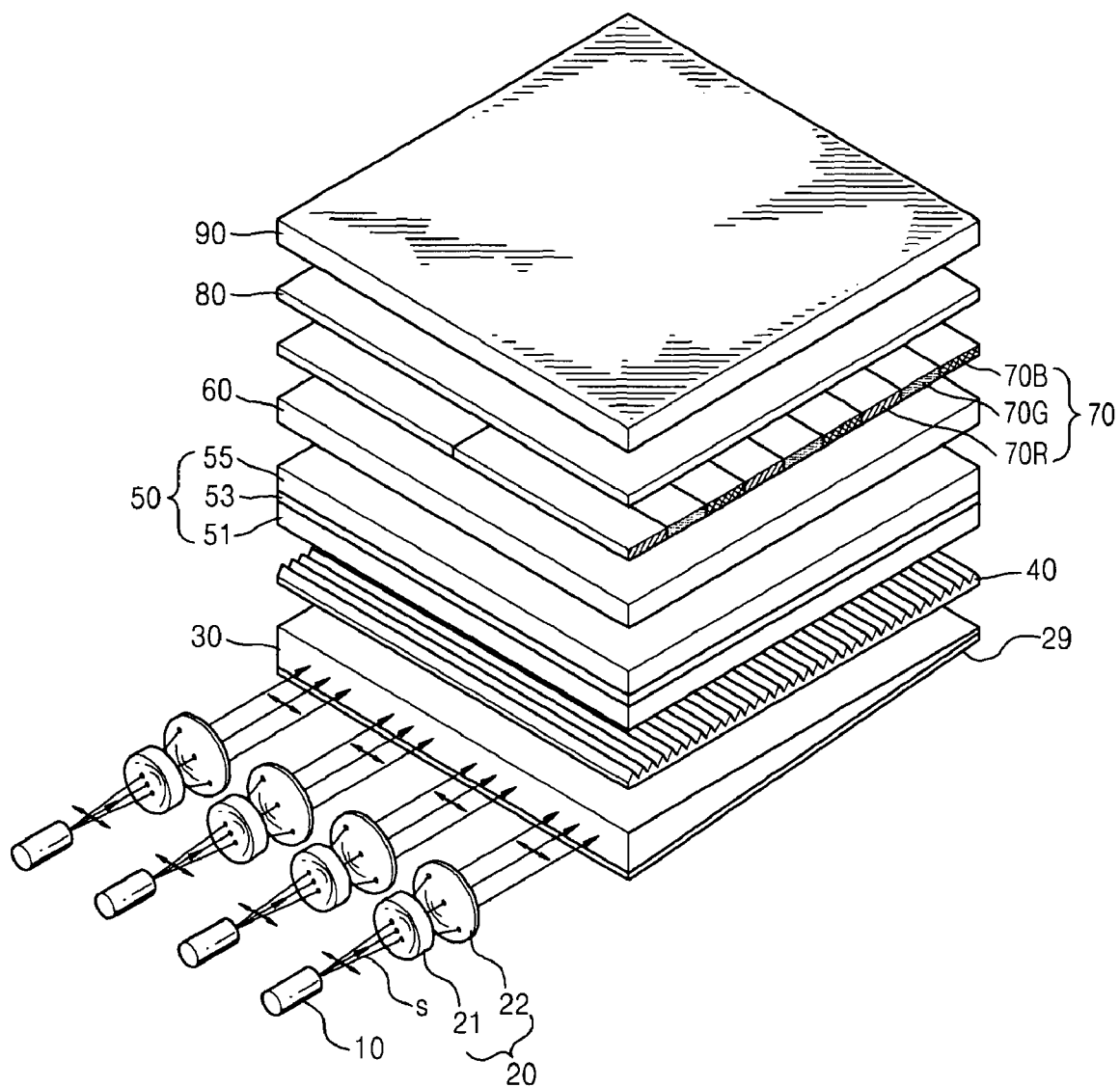
Figure 3:
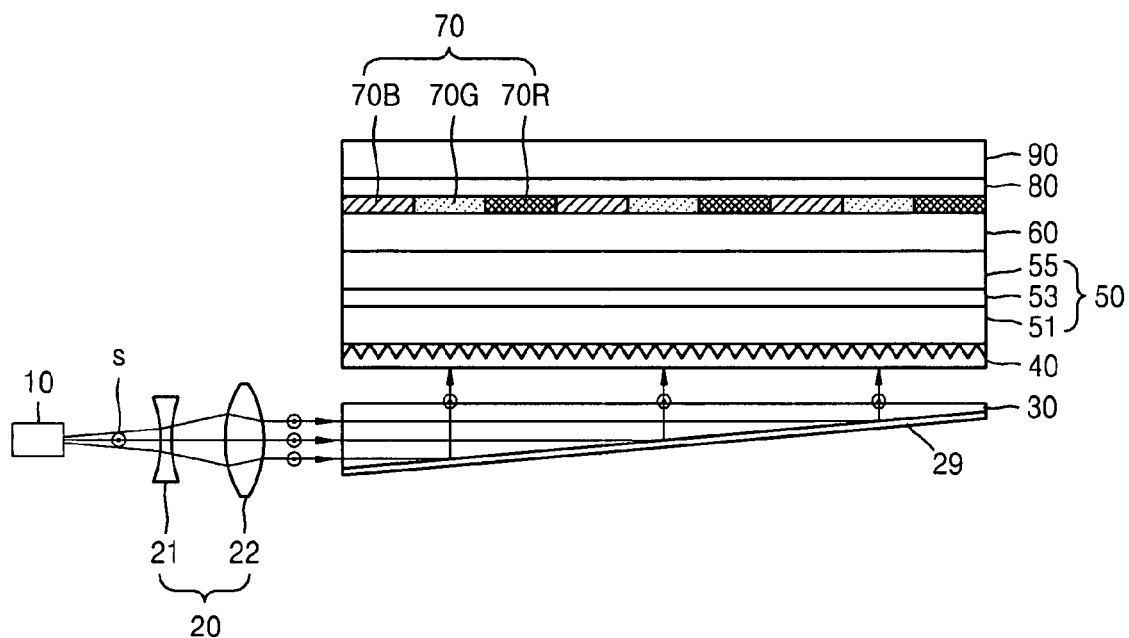

FIG. 2 is a schematic exploded perspective view of a photoluminescence LCD according to example embodiments, and FIG. 3 is a side view of the photoluminescence LCD depicted in FIG. 2. Referring to FIGS. 2 and 3, the photoluminescence LCD may include a light source 10, a light guide plate 30, a light control unit 50, a polarizer 60, and a photoluminescence layer 70. The light source 10 may emit polarized light, the light guide plate 30 may guide the polarized light, and the light control unit 50 may receive the polarized light from the light guide plate 30. The polarizer 60 may receive light modulated by the light control unit 50 and may transmit the received light having a predetermined or given polarization direction. The photoluminescence layer 70 may be excited by light transmitted through the polarizer 60 and may emit light by photoluminescence. The light source 10 may include a plurality of semiconductor laser diodes.

Gallium based semiconductor laser diodes that emit near-ultraviolet blue light (for example, light with a wavelength band of about 370 nm to about 420 nm) may be used for the light source 10. Each of the semiconductor laser diodes may have a waveguide structure, e.g., a ridge structure of an edge emitting laser diode, which has adjustable polarization characteristics. A laser beam having a predetermined or given polarization direction may be irradiated from the light source 10 to the light control unit 50 without an additional polarization plate. The light source 10 of example embodiments may not be limited to using the semiconductor laser diodes. The light source 10 may include other types of light sources that emit polarized light in one direction. In the embodiment illustrated in FIG. 2, the light source 10 may emit s-polarized light. The s-polarized light may be linearly polarized light having a polarization direction perpendicular to the plane of incident of the light guide plate 30 (e.g., perpendicular to plane of FIG. 3).

In example embodiments, the photoluminescence LCD may have an edge type backlight structure in which the light source 10 is disposed on a lateral side of the light control unit 50, and the light guide plate 30 may guide light emitted from the light source 10 to a rear surface of the light control unit 50. The photoluminescence LCD of example embodiments may have a direct type backlight structure in which a plurality of the semiconductor laser diodes are disposed on a rear side of the light control unit 50. The light guide plate 30 may not be required. Light emitted from the light source 10 may be incident on the rear surface of the light control unit 50 through the light guide plate 30. In order to uniformly illuminate the rear surface of the light control unit 50, the light source 10 may emit a uniform light beam having a sufficiently large width.

When the width of the light beam emitted from the light source 10 is narrow, a beam expander 20 may be additionally provided to expand the light beam. The beam expander 20 may face a light emitting surface of the light source 10 to receive light emitted from the light source 10. While maintaining the polarization direction of the received light, the beam expander 20 may expand the received light and may make the expanded light straight. For example, the beam expander 20 may have two lenses 21 and 22 as illustrated in FIG. 2.

In order to uniformly irradiate light emitted from the light source 10 to the light guide plate 30, the beam expander 20 may include an optical collimator to collimate light emitted from the light source 10. The beam expander 20 may function as an optical collimator, or a separate optical collimator may be provided.

The light guide plate 30 may be disposed on an incident surface (the rear surface) of the light control unit 50. The light guide plate 30 may refract the light emitted from the light source 10 while maintaining the polarization direction of the light to guide the light toward the rear surface of the light control unit 50. The light guide plate 30 may be a transparent member having a smooth slope. The light guide plate 30 may have a side surface receiving light emitted from the light source 10, a top surface facing the light control unit 50, and an inclined surface opposite to the top surface. The inclined surface may have a smooth slope so as to reflect all light incident thereon. The light guide plate 30 may be formed of a plastic material, an acrylic material and/or an optical glass material. The light guide plate 30 may receive line light from a plurality of point light sources (the semiconductor laser diode of the light source 10) arranged in a row and may release the received light in the form of surface light.

A reflection sheet 29 may be additionally disposed on the inclined surface of the light guide plate 30. Light coming out through the inclined surface of the light guide plate 30 may be reflected back to the light guide plate 30 by the reflection sheet 26.

Figure 4:
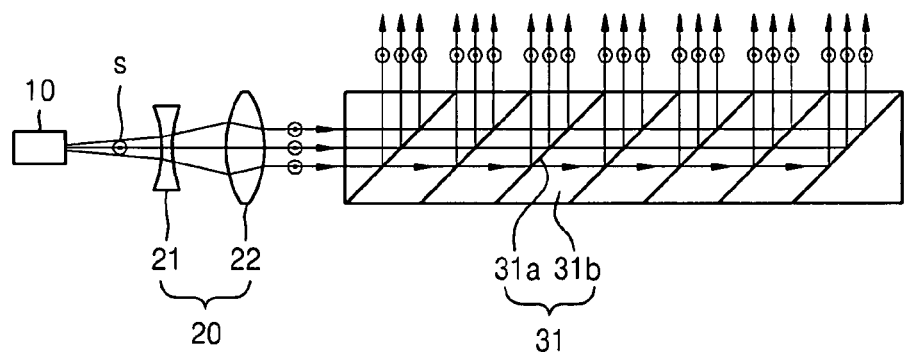

FIG. 4 is a view illustrating a light guide plate 31 according to example embodiments. Referring to FIG. 4, the light guide plate 31 may be a solid transparent plate having a light receiving surface on one side. The light guide plate 31 may include an inner region 31b that is divided by a plurality of surfaces 31a inclined with respect to the light receiving surface. The inclined surfaces 31a may be coated to exhibit a semi-reflective characteristic. The light guide plate 31 may include a plurality of transparent sticks each having an inclined surface.

The light guide plate 31 may be formed of a plastic material, an acrylic material and/or an optical glass material. The inclined surfaces 31a may be coated in such a manner that the inclined surfaces 31a may increase in reflectivity as the distance from the light source 10 increases. The farthest inclined surface 31a from the light source 10 may be coated to exhibit a reflectivity of about 100% so as to perfectly reflect light incident thereon.

Returning to the embodiment illustrated in FIGS. 2 and 3, the photoluminescence LCD may further include a prism sheet 40. The prism sheet 40 may refract and condense light from the light guide plate 30 to illuminate the light control unit 50 at an increased brightness. The prism sheet 40 may include a plurality of prisms on a light exit surface. The longitudinal direction of the prisms may be parallel with the polarization direction of incident light. Although the incident light is refracted while passing through the prism sheet 40, the polarization direction of the light may not be changed. The light control unit 50 may be disposed on the light exit surface of the prism sheet 40. The light control unit 50 may include a rear substrate 51, a front substrate 55, and a liquid crystal layer 53 interposed or inserted between the rear substrate 51 and the front substrate 55.

The liquid crystal layer 53 may change the polarization direction of incident light. For example, when an electrical field is applied to the liquid crystal layer 53, the molecular alignment of the liquid crystal layer 53 may change, and thus the polarization direction of incident light may change while the light is passing through the liquid crystal layer 53. By changing the molecular alignment of the liquid crystal layer 53 in this way, light having a particular polarization direction may be transmitted or blocked. An image may be displayed using this mechanism. Switching devices (not shown), e.g., thin film transistors (TFTs) and pixel electrodes (not shown), may be disposed on inner surfaces of the rear substrate 51 and front substrate 55. The switching devices and the pixel electrodes make up a plurality of pixels. For example, in each pixel region of the light control unit 50, the switching device and the pixel electrodes may be provided, so that each pixel region may be individually controlled.

The polarizer 60 may be disposed on an exit surface of the light control unit 50 and may transmit light modulated to a predetermined or given polarization direction by the light control unit 50. Because the polarization of light passing through the liquid crystal layer 53 is maintained or turned by about 90° depending on whether an electrical field is applied to the liquid crystal layer 53, the polarizer 60 may transmit light having a polarization direction perpendicular to the polarization direction of light emitted from the light source 10 (e.g., when the polarization of light emitted from the light source 10 is turned by about 90°, the light may be transmitted through the polarizer 60).

The photoluminescence layer 70 may be disposed on an exit surface of the polarizer 60. The photoluminescence layer 70 may emit light by photoluminescence when receiving laser light of a near-ultraviolet wavelength band. When a particular substance is stimulated by light, the substance may emit excitation light. This phenomenon is called photoluminescence, and examples of photoluminescence include fluorescence and phosphorescence. The term "luminescence" denotes a phenomenon in which a state of substance changes into an excitation state by absorbing energy, e.g., light, electricity and/or radiation, and returns to a ground state by emitting the absorbed energy in the form of light. In order to emit light by photostimulation, light may be irradiated to a phosphor within a predetermined or given wavelength range so that the light may be absorbed by the phosphor. The phosphor may emit excitation light having a wavelength equal to or greater than that of the irradiated light. Visible light (excitation light) may be obtained using a blue laser beam having a short wavelength.

In example embodiments, the photoluminescence layer 70 may include RGB sets corresponding to the pixel regions of the light control unit 50, and each of the RGB sets may include a red photoluminescence region 70R, a green photoluminescence region 70G, and a blue photoluminescence region 70B. The red photoluminescence region 70R, the green photoluminescence region 70G, and the blue photoluminescence region 70B may have an absorption spectrum at an incident near-ultraviolet wavelength and respectively emit red, green, and blue excitation light. The red photoluminescence region 70R, the green photoluminescence region 70G, and the blue photoluminescence region 70B may make up one color pixel.

The blue photoluminescence region 70B, the green photoluminescence region 70G, and the red photoluminescence region 70R may be formed of well-known phosphors. For example, the blue photoluminescence region 70B may be formed of a blue phosphor selected from the group consisting of $(Sr,Mg,Ca)_{10}(PO_4)_6Cl_2:Eu^{2+}$, $BaMgAl_{10}O_{17}:Eu^{2+}$, and $BaMg_2Al_{16}O_{27}:Eu^{2+}$. The green photoluminescence region 70G may be formed of a green phosphor selected from the group consisting of $SrGa_2S_4:Eu^{2+}$, $(Ba,Sr)SiO_4:Eu^{2+}$, $MgSi_2O_7$, $SrAl_2O_4:Eu^{2+}$, $Ca_8Mg(SiO_4)_4Cl_2:Eu^{2+}$, and $(Cr,Ca)(Al,Si)_2:Eu^{2+}$. The red photoluminescence region 70R may be formed of a red phosphor selected from the group consisting of $(Sr,CaS):Eu^{2+}$, $(Sr,Ca)_2Si_5N_8:Eu^{2+}$, and $Mg_4GeO_{5.5}F;Mn^{4+}$.

An ultraviolet filter 80 may be disposed on an exit surface of the photoluminescence layer 70. The ultraviolet filter 80 may be formed of a chemical screening material that absorbs ultraviolet light or a mechanical screening material that reflects and scatters incident ultraviolet light. Examples of the chemical screening material include para-aminobenzoic acid (PABA) derivatives, cinnamate derivatives, salicylic acid derivatives, benzophenone and benzophenone derivatives, and anthranilate and anthranilate derivatives. Examples of the mechanical screening material include a zinc oxide, a titanium oxide, an iron oxide, and a magnesium oxide. The ultraviolet filter 80 may intercept near ultraviolet light transmitted through the photoluminescence layer 70 and may prevent or reduce outside ultraviolet light from being incident on the photoluminescence layer 70, thereby improving the contrast ratio of the photoluminescence LCD. Optical components of an LCD panel may be protected by attaching a protection glass 90 to an exit surface of the ultraviolet filter 80.

Operation of the photoluminescence LCD according to example embodiments will now be described. The semiconductor diodes of the light source 10 may be arranged in a row on a side of the light guide plate 30. The light source 10 may emit s-polarized light. A beam width of the s-polarized light emitted from the light source 10 may be expanded by the beam expander 20. The s-polarized light may be incident to the light guide plate 30 in the form of line light. When the s-polarized light passes through the beam expander 20, the s-polarized light may not change polarization direction although the beam width of the light is expanded.

The light guide plate 30 may refract the incident s-polarized light and may change the s-polarized light from line light into surface light. The s-polarized light may be incident to the prism sheet 40 while maintaining its polarization direction. The prism sheet 40 may refract the s-polarized light to make the s-polarized light more uniform. Because the longitudinal direction of the prisms of the prism sheet 40 is parallel with the polarization direction of the s-polarized light, the s-polarized light may not change polarization while being refracted in the prism sheet 40.

After the prism sheet 40, the light may be incident onto the light control unit 50 while maintaining its original polarization direction on the light source 10. When transmitting the incident light, the light control unit 50 may individually control the pixel regions of the liquid crystal layer 52 according to an image signal. After the light passes through the light control unit 150, the polarization direction of the light may be turned about 90 degrees or not turned according to the pixel regions.

The light may be incident on the polarizer 60. For example, when the polarizer 60 is configured to transmit light having a polarization direction perpendicular to that of the s-polarized light emitted from the light source 10, only the about 90-degree turned light may be transmitted through the polarizer 60. The light may be incident to the photoluminescence layer 70 to form a color image.

Figure 5A:
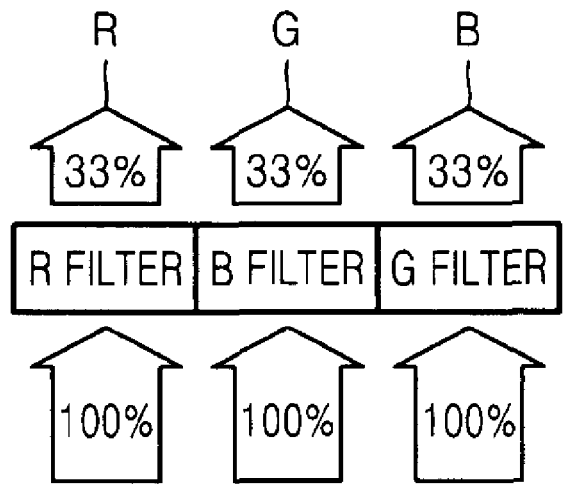
FIGS. 5A and 5B are views respectively illustrating the light use efficiency of a conventional LCD and the light use efficiency of a photoluminescence LCD of example embodiments.
Figure 5B:
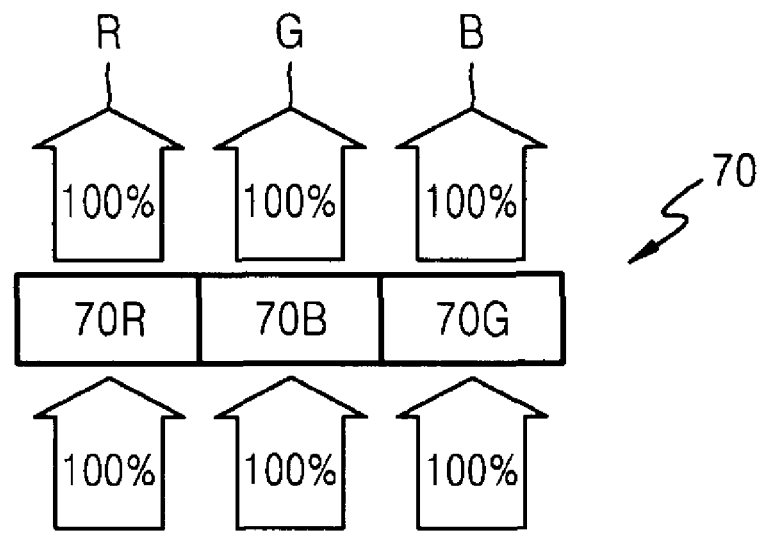

As described above, the photoluminescence LCD of example embodiments may display a color image without using a color filter, so that the light use efficiency of the photoluminescence LCD may be increased. FIG. 5A is a view illustrating the light use efficiency of a conventional LCD, and FIG. 5B is a view illustrating the light use efficiency of the photoluminescence LCD of example embodiments. Referring to FIG. 5A, when a color filter is used in the conventional LCD, only one third of white light may pass through red (R), blue (B), and green (G) filter regions of the color filter. For example, the red (R) filter region may transmit only a red component of the white light, the blue (B) filter region may transmit only a blue component of the white light, and the green (G) filter region may transmit only a green component of the white light. The light use efficiency of the color filter may be merely about 33%. Referring to FIG. 5B, the photoluminescence LCD may use the photoluminescence layer 70 for each pixel. The maximal light use efficiency in each pixel of the photoluminescence layer 70 may approach about 100%. Because the photoluminescence LCD of example embodiments uses the photoluminescence layer 70, the photoluminescence LCD may have a light use efficiency about three times larger than that of the conventional LCD using the color filter.

In example embodiments, an additional rear polarizer may not be disposed on an incident surface of the light control unit 50. For example, the number of the polarizer may be reduced by at least one compared to the conventional LCD. As illustrated in FIG. 1, there may be an increased amount of light loss caused by the polarizer. The light loss in the photoluminescence LCD of example embodiments may be reduced.

In example embodiments, laser light having an increased directivity may be used as illumination light to improve contrast ratio. For example, in the conventional LCD, crosstalk may occur between adjacent pixels because light emitted from a light source may have a predetermined or given divergence angle. In example embodiments, the light source 10 may emit laser light having an increased directivity and low divergence angle so that substantially parallel light may be irradiated to the light control unit 50. Crosstalk may be prevented or reduced between adjacent pixels, and thus contrast ratio may be improved. In example embodiments, the aperture ratio of the light control unit 50 may be increased by using laser light having an increased directivity. Even when a gap between adjacent pixels decreases, crosstalk may be prevented or reduced between adjacent pixels because of the increased directivity of the laser light. When a pixel pattern is formed, a light transmitting area of each pixel may be increased, so the aperture ratio of the light control layer 50 may be increased. Brightness and viewing angle may also be increased. The number of required light sources may be reduced due to the increased light use efficiency.

Figure 6:
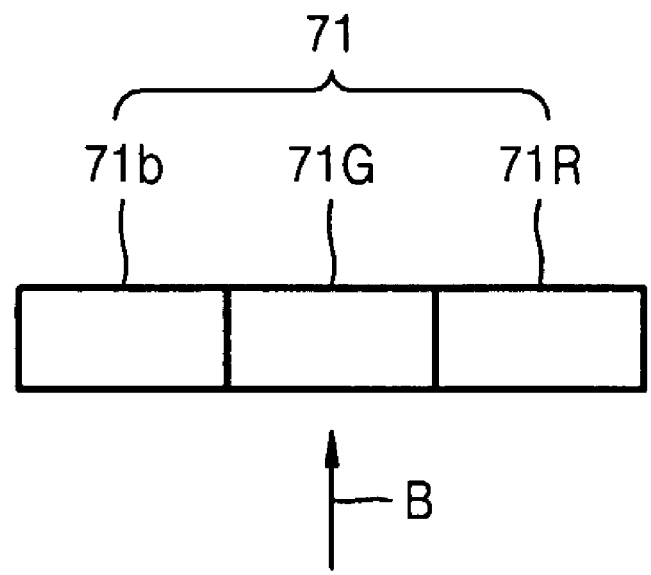

FIG. 6 is a schematic cross-sectional view of a photoluminescence layer 71 of a photoluminescence LCD according to example embodiments. In example embodiments, the photoluminescence LCD may have substantially the same structure as the embodiment illustrated in FIGS. 2 and 3, except that the photoluminescence LCD may use a blue light source and the photoluminescence layer 71. In the following description, the blue light source and the photoluminescence layer 71 will be mainly described.

Unlike the above-described embodiments, the blue light source may emit blue laser light especially in a wavelength band ranging from about 420 nm to about 480 nm. Gallium based semiconductor laser diodes may be used for the blue light source. The photoluminescence layer 71 may include a transparent region 71*b*, a green photoluminescence region 71G, and a red photoluminescence region 71R that correspond to one pixel region of the light control unit (50 of FIG. 2).

The transparent region 71*b* may correspond to the blue photoluminescence region 70B of the photoluminescence layer 70 of FIG. 2. The transparent region 71*b* may transmit light, such that the blue color of light emitted from the blue light source may be present at the transparent region 71*b* without a change. The green photoluminescence region 71G and the red photoluminescence region 71R may have an absorption spectrum for incident blue light and respectively emit green and red excitation light. The transparent region 71*b*, the green photoluminescence region 71G, and the red photoluminescence region 71R correspond to a blue pixel, a green pixel, and a red pixel, respectively, thereby providing full color.

In example embodiments, the photoluminescence layer 71 may use green excitation light for a green pixel, red excitation light for a red pixel, and intact blue light of the blue light source for a blue pixel. The light use efficiency of photoluminescence layer 71 may approach about 100%. The photoluminescence LCD of example embodiments may have a light use efficiency about three times larger than that of the conventional LCD because red and green excitation light of the photoluminescence layer 71 and blue light of the blue light source are used for displaying a full color image.

Like the above-described embodiments, the photoluminescence LCD of example embodiments may not require an additional rear polarizer on an incident surface of the light control unit 50. For example, the number of the polarizer may be reduced by at least one compared to the conventional LCD. As illustrated in FIG. 1, increased light loss caused by the polarizer may be reduced in the photoluminescence LCD of example embodiments. Other advantages of the embodiment illustrated in FIG. 6 due to the use of laser light are substantially the same as in the embodiment of FIGS. 2 and 3. Thus, descriptions of these advantages will be omitted.

Figure 7:
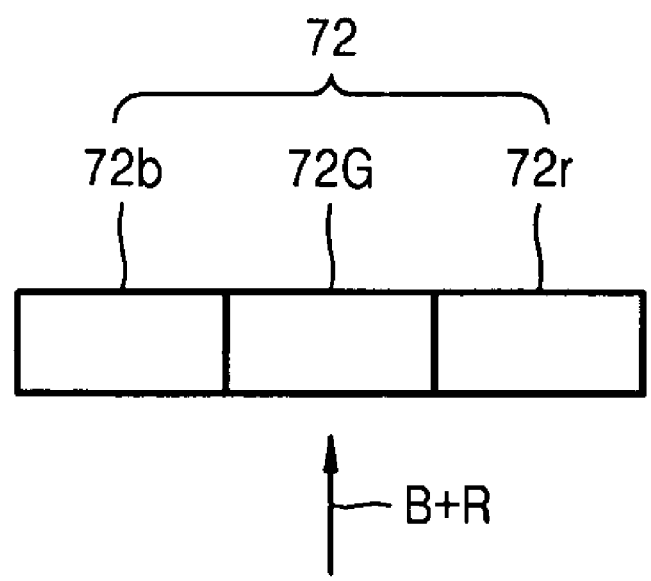

FIG. 7 is a schematic cross-sectional view of a photoluminescence layer 72 of a photoluminescence LCD according to example embodiments. The embodiment of FIG. 7 is substantially the same as the embodiment of FIGS. 2 and 3, except for a light source and the photoluminescence layer 72. The light source and the photoluminescence layer 72 will now be mainly described.

In example embodiments, the light source may emit blue and red laser light. The blue laser light may have a wavelength band ranging from about 420 nm to about 480 nm, and the red laser light may have a wavelength band ranging from about 600 nm to about 720 nm. Gallium based semiconductor laser diodes may be used for the light source. In example embodiments, the photoluminescence layer 72 may include a blue transparent region 72b, a green photoluminescence region 72G, and a red transparent region 72r that correspond to a pixel region of the light control unit 50. The blue transparent region 72b corresponds to the blue photoluminescence region 70B of the photoluminescence layer 70 of FIG. 2. The red transparent region 72r corresponds to the red photoluminescence region 70R of the photoluminescence layer 70 of FIG. 2.

The blue transparent region 72b may transmit blue light and may reflect or absorb red light. The red transparent region 72r may transmit red light and may reflect or absorb blue light. The green photoluminescence region 72G may have an absorption spectrum for incident blue light and may emit green excitation light. The green photoluminescence region 72G may reflect or absorb red light.

The blue transparent region 72b, the green photoluminescence region 72G, and the red transparent region 72r correspond to a blue pixel, a green pixel, and a red pixel, respectively, so that a full color image may be provided.

The photoluminescence LCD of example embodiments may have a reduced brightness difference between the colors when the luminous efficiency of a red phosphor by blue light is lower than that of a green phosphor. For example, green pixels may use green excitation light emitted from the green photoluminescence region 72G excited by blue light, and blue and red pixels use blue and red light emitted from the light source. Adjusting a brightness difference between color pixels may be easier. In example embodiments, the light use efficiency in each pixel of the photoluminescence layer 72 may approach about 50%. The photoluminescence LCD may have an improved light use efficiency compared to the conventional LCD.

Like the above-described embodiments, the photoluminescence LCD of example embodiments may not require an additional rear polarizer on the incident surface of the light control unit 50. For example, the number of the polarizer may be reduced by at least one compared to the conventional LCD. As illustrated in FIG. 1, an increased amount of light loss caused by the polarizer may be reduced in the photoluminescence LCD of example embodiments.

The photoluminescence LCD of example embodiments may have an improved light use efficiency and increased brightness. The photoluminescence LCD may be suitable for portable devices. For example, the photoluminescence LCD may operate for a long time using the same power compared to the conventional LCD, because the light use efficiency is increased. Because the photoluminescence LCD has an increased brightness, interference by external light may be minimized or reduced.

As described above, the photoluminescence LCD according to example embodiments has the following advantages. Because of the way polarized light is used, an additional polarizer may not be disposed on the rear surface of the light control unit, thereby reducing the light loss by the polarizer. Because the photoluminescence LCD displays a color using image excitation light without a color filter, light loss by the color filter may be removed. When laser light having an increased directivity is used as illumination light, contrast ratio and viewing angle may be improved.

While example embodiments have been particularly shown and described with reference to example embodiments thereof, it will be understood by those of ordinary skill in the art that various changes in form and details may be made therein without departing from the spirit and scope of the following claims.

What is claimed is:

1. A photoluminescence LCD (liquid crystal display) comprising:
   a light source emitting polarized light;
   a light control unit including a liquid crystal layer having a plurality of pixel regions and modulating a polarization direction of the polarized light individually with respect to each of the pixel regions;
   a polarizer transmitting the modulated light only when the polarized light has a polarization direction;
   a photoluminescence layer excited by the light transmitted through the polarizer and emitting excitation light by photoluminescence; and
   a light guide plate being on a rear surface of a light control unit to guide the polarized light emitted from the light source to the light control unit while maintaining the polarization direction of the polarized light,
   wherein the light source is a semiconductor laser diode, and
   the light source is on a lateral side of the light control unit.

2. The photoluminescence LCD of claim 1, further comprising:
   a beam expander expanding a beam width of the polarized light emitted from the light source so as to uniformly illuminate a rear surface of the light control unit using expanded light.

3. The photoluminescence LCD of claim 1, further comprising:
   a collimator lens set collimating the polarized light emitted from the light source so as to uniformly illuminate a rear surface of the light control unit using collimated light.

4. The photoluminescence LCD of claim 1, wherein the light source emits single-color laser light.

5. The photoluminescence LCD of claim 4, wherein the light source emits blue laser light.

6. The photoluminescence LCD of claim 5, wherein the blue laser light has a wavelength band ranging from about 420 nm to about 480 nm.

7. The photoluminescence LCD of claim 6, wherein the photoluminescence layer includes a transparent region, a green photoluminescence region, and a red photoluminescence region that correspond to the pixel region of the light control unit.

8. The photoluminescence LCD of claim 7, wherein the green photoluminescence region and the red photoluminescence region have an absorption spectrum in the wavelength band of the blue laser light.

9. The photoluminescence LCD of claim 4, wherein the single-color laser light has a wavelength band ranging from about 370 nm to about 420 nm.

10. The photoluminescence LCD of claim 9, wherein the photoluminescence layer has an absorption spectrum in the wavelength band of the single-color laser light.

11. The photoluminescence LCD of claim 4, wherein the light source emits near-ultraviolet light.

12. The photoluminescence LCD of claim 11, wherein the photoluminescence layer includes a blue photoluminescence region, a green photoluminescence region, and a red photoluminescence region that correspond to the pixel region of the light control unit.

13. The photoluminescence LCD of claim 11, further comprising:
   an ultraviolet filter on an exit surface of the photoluminescence layer for screening ultraviolet light.

14. The photoluminescence LCD of claim 1, wherein the light source emits laser light of at least two colors.

15. The photoluminescence LCD of claim 14, wherein the light source emits blue and red laser light.

16. The photoluminescence LCD of claim 15, wherein the blue laser light has a wavelength band of 420 nm to 480 nm, and the red laser light has a wavelength band of 600 nm to 720 nm.

17. The photoluminescence LCD of claim 16, wherein the photoluminescence layer includes a blue transparent region, a green photoluminescence region, and a red transparent region that correspond to the pixel region of the light control unit.

18. The photoluminescence LCD of claim 17, wherein the green photoluminescence region has an absorption spectrum in the wavelength band of the blue laser light.

\* \* \* \* \*